(12) United States Patent
Nasu et al.

(10) Patent No.: US 6,683,730 B2
(45) Date of Patent: Jan. 27, 2004

(54) VARIABLE-FOCUS LENS SYSTEM (75) Inventors: Sachiko Nasu, Kanagawa (JP); Eijiroh Tada, Saitama (JP)

(73) Assignee: Pentax Precision Co., Ltd., Tokyo (JP)

( * ) Notice: Subject to any disclaimer, the term of this patent is extended or adjusted under 35 U.S.C. 154(b) by 0 days.

(21) Appl. No.: 10/024,227

(22) Filed: Dec. 21, 2001

(65) Prior Publication Data
US 2002/0126393 A1 Sep. 12, 2002

(30) Foreign Application Priority Data
Jan. 11, 2001 (JP) .......................... 2001-03691

(51) Int. Cl.[7] .......................... G02B 15/177
(52) U.S. Cl. .......................... 359/691; 359/682
(58) Field of Search .................. 359/691, 682

(56) References Cited
U.S. PATENT DOCUMENTS
4,838,666 A * 6/1989 Shiraishi .................. 359/689

FOREIGN PATENT DOCUMENTS
EP  0620467  10/1994
GB  2090998  7/1982

* cited by examiner

Primary Examiner—Scott J. Sugarman
Assistant Examiner—Deborah Raizen
(74) Attorney, Agent, or Firm—Greenblum & Bernstein, P.L.C.

(57) ABSTRACT

A variable-focus lens system includes a negative front lens group, and a positive rear lens group. The focal length of the variable-focus lens system is varied by changing the distance between the front and said rear lens groups. The lens system satisfies the following conditions:

$$-3.0 < fx/Fw < -2.5$$

$$3.0 < fy/Fw < 3.5$$

wherein fx designates the focal length of the front lens group, which is less than zero;

fy designates the focal length of the rear lens group, which is greater than zero; and Fw designates the focal length of the entire variable-focus lens system at the short focal length extremity.

18 Claims, 11 Drawing Sheets

-0.02   0.02
SPHERICAL
ABERRATION

CHROMATIC
ABERRATION

-0.02   0.02
ASTIGMATISM

-40 (%) 40
DISTORTION

-0.02  0.02
SPHERICAL
ABERRATION

CHROMATIC
ABERRATION

-0.02  0.02
ASTIGMATISM

Fig. 4C
$W=25.2°$

-40 (%) 40
DISTORTION

SPHERICAL ABERRATION

CHROMATIC ABERRATION

Fig. 6B

ASTIGMATISM

Fig. 6C

DISTORTION

SPHERICAL ABERRATION

CHROMATIC ABERRATION

Fig. 8B

ASTIGMATISM

Fig. 8C

DISTORTION

SPHERICAL
ABERRATION

CHROMATIC
ABERRATION

Fig. 10B

ASTIGMATISM

Fig. 10C

DISTORTION

SPHERICAL
ABERRATION

CHROMATIC
ABERRATION

Fig. 12B

ASTIGMATISM

Fig. 12C

DISTORTION

-0.02   0.02
SPHERICAL
ABERRATION

CHROMATIC
ABERRATION

-0.02   0.02
ASTIGMATISM

Fig. 14C $W=59.4°$

-40  (%)  40
DISTORTION

-0.02   0.02
SPHERICAL
ABERRATION

CHROMATIC
ABERRATION

-0.02   0.02
ASTIGMATISM

-40 (%) 40
DISTORTION

-0.02  0.02
SPHERICAL
ABERRATION

CHROMATIC
ABERRATION

-0.02  0.02
ASTIGMATISM

-40 (%) 40
DISTORTION

-0.02  0.02
SPHERICAL
ABERRATION

CHROMATIC
ABERRATION

-0.02  0.02
ASTIGMATISM

-40 (%) 40
DISTORTION

Fig. 21

VARIABLE-FOCUS LENS SYSTEM

BACKGROUND OF THE INVENTION

1. Field of the Invention

The present invention relates to a variable-focus lens system in which a focal length is varied, and in particular, relates to a variable-focus lens system which is usable in wavelength ranges, particularly in a visible light wavelength range (about 400~700 nm) through to a near-infrared light wavelength range (about 700~1000 nm).

2. Description of the Prior Art

A surveillance camera preferably has a photographing lens system which can perform photographing operation in a visible light wavelength range at daytime, and can perform photographing operation in a near-infrared light wavelength range at nighttime. Some of such photographing lens systems have been put into practical use. However, it is still difficult to suitably correct aberrations, particularly chromatic aberration, in a visible wavelength light range over to a near-infrared light wavelength range, without making the lens arrangement complicated.

SUMMARY OF THE INVENTION

It is an object of the present invention to provide a variable-focus lens system which can suitably correct aberrations in a visible light wavelength range and a near-infrared light wavelength range.

In order to achieve the above-mentioned object, there is provided a variable-focus lens system including a negative powered (hereinafter, negative) front lens group, and a positive powered (hereinafter, positive) rear lens group, in this order from the object. The focal length of the variable-focus lens system is varied by changing the distance between the front lens group and the rear lens group, and the lens system satisfies the following conditions:

$$-3.0 < fx/Fw < -2.5 \quad (1)$$

$$3.0 < fy/Fw < 3.5 \quad (2)$$

wherein fx designates the focal length of the front lens group (fx<0);

fy designates the focal length of the rear lens group (fy>0); and

Fw designates the focal length of the entire variable-focus lens system at the short focal length extremity.

It is preferable that the rear lens group is used within a range to satisfy the following condition:

$$-0.9 < m < -0.3 \quad (3)$$

wherein m designates the image-forming magnification of the rear lens group.

More concretely, the front lens group 10 can include two sub-lens groups constituted by three lens elements L1 through L3, and the rear lens group 20 includes five sub-lens groups constituted by six lens elements. Furthermore, the rear lens group 20 is preferably constituted by a positive lens element L4, a positive lens element L5, a negative lens element L6, a positive lens element L7, and positive cemented lens elements constituted by a negative lens element L8 and a positive lens element L9, in this order from the front lens group 10. In addition, the positive lens element L7 can satisfy the following conditions:

$$1.73 < n7 < 1.83 \quad (4)$$

$$30 < v7 < 40 \quad (5)$$

wherein n7 designates the refractive index of the lens element L7; and v7 designates the Abbe number of the lens element L7.

Still further, one of the lens elements L8 and L9 which constitute the cemented lens elements can be composed of a convex lens element satisfying conditions (6) and (7), and the other of the lens elements L8 and L9 can be composed of a concave lens element satisfying 13 conditions (8) and (9):

$$70 < v\text{-convex} \quad (6)$$

$$14.0 < f\text{-convex}/Fw < 25.0 \quad (7)$$

$$30 > v\text{-concave} \quad (8)$$

$$-7.3 < f\text{-concave}/Fw < -4.5 \quad (9)$$

wherein v-convex designates the Abbe number of the convex lens element;

f-convex designates the focal length of the convex lens elements;

v-concave designates the Abbe number of the concave lens element; and f-concave designates the focal length of the concave lens elements.

The present disclosure relates to subject matter contained in Japanese Patent Application No. 2001-3691 (filed on Jan. 11, 2001) which is expressly incorporated herein in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 21:
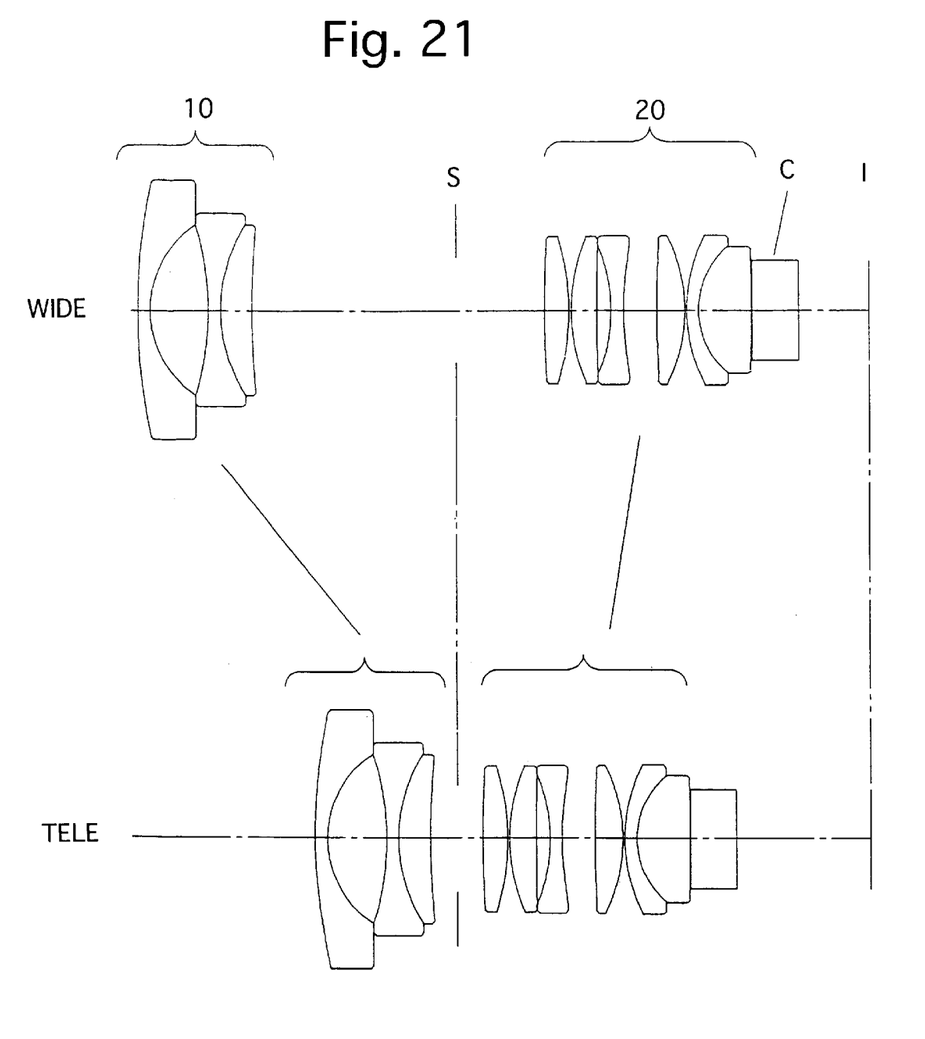
FIG. 21 shows lens-group moving paths of the variable-focus lens system according to the present invention.

The lens systems described in the embodiments to be discussed hereinafter is a variable-focus lens system in which the position of the image forming plane moves according to the change in the focal length. As shown in the lens-group moving paths of FIG. 21, the variable-focus lens system includes a negative front lens group 10, a diaphragm S, and a positive rear lens group 20, in this order from the object. The front lens group 10, the diaphragm S and the rear lens group 20 respectively move in the optical axis direction according to the change in the focal length. More specifically, upon zooming from the short focal length extremity to the long focal length extremity, the front lens group 10 moves toward the image, and the rear lens group 20 moves toward the object, while the distance between the diaphragm S and the image forming plane I is constant. The operation to vary the focal length is performed by the rear lens group 20. The change in the focal points caused by this movement of the rear lens group 20 is compensated by moving the front lens group 10 along the optical axis direction. In the case where the variable-focus lens system is provided in a surveillance camera, the focal length thereof is varied (i.e., varying the angle of view) so that an in-focus state of an object to be surveyed can be obtained from a place where the surveillance camera is mounted. Accordingly, the operation of the front lens group 10 to compensate the change in the focal points caused by the movement of the rear lens group 20 can be manually carried out without causing any adverse influence on the practical use of the surveillance camera.

As shown in the lens arrangement of each embodiment, the front lens group 10 includes a negative meniscus first lens element L1 having the convex surface facing toward the object, a negative biconcave second lens element L2, and a positive third lens element L3, in this order from the object. The negative biconcave second lens element L2 and the positive third lens element L3 are cemented. In other words, the front lens group 10 is composed of the two sub-lens groups constituted by the three lens elements. The rear lens group 20 includes a positive fourth lens element L4, a positive fifth lens element L5, a negative sixth lens element L6, a positive seventh lens element L7, a negative eighth lens element L8, and a positive ninth lens element L9, in this order from the first lens group 10. The negative eighth lens element L8 and the positive ninth lens element L9 are cemented, and the entire cemented lens elements have positive power. A cover glass for a image pick-up device is indicated by C in FIG. 1.

Condition (1) specifies the ratio of the focal length of the front lens group 10 to the focal length of the entire lens system at the short focal length extremity. By satisfying this condition, spherical aberration, astigmatism, and chromatic aberration can be corrected.

If fx/Fw exceeds the upper limit of condition (1), spherical aberration is overcorrected, and lateral chromatic aberration is undercorrected.

If fx/Fw exceeds the lower limit of condition (1), spherical aberration is undercorrected. Furthermore, at focal length positions where the angle-of-view is larger, higher order aberrations and astigmatism occur.

Condition (2) specifies the ratio of the focal length of the rear lens group 20 to the focal length of the entire lens system at the short focal length extremity. By satisfying this condition, spherical aberration, coma, astigmatism and chromatic aberration can be corrected.

If fy/Fw exceeds the upper limit of condition (2), spherical aberration and axial chromatic aberration are undercorrected, and coma is overcorrected. Furthermore, at focal length positions where the angle-of-view is larger, higher order aberrations and astigmatism occur.

If fy/Fw exceeds the lower limit of condition (2), spherical aberration is overcorrected, and coma is undercorrected.

The variable-focus lens system of the embodiments has a zoom ratio of about 2, and the angle-of-view is about 22° to 51°. In order to attain a zoom ratio of about 2, the positive rear lens group 20 which forms a virtual image formed by the negative front lens group 10 onto the image-forming plane is preferably used within the range of the image-forming magnification defined by "−0.9<m <−0.3", i.e., satisfying condition (3).

If the image-forming magnification 'm' exceeds the upper limit of condition (3), spherical aberration and axial chromatic aberration are undercorrected, so that it becomes difficult to secure a necessary zoom ratio.

If the image-forming magnification 'm' exceeds the lower limit of condition (3), spherical aberration and axial chromatic aberration are overcorrected.

As shown in the embodiments, the front lens group 10 includes the two sub-lens groups constituted by the three lens elements L1 to L3, and the rear lens group 20 includes the five sub-lens groups constituted by the six lens elements L4 to L9. According to this arrangement, a cost-effective variable-focus lens system can be obtained. More specifically, the rear lens group 20 is preferably constituted by the positive fourth lens element L4, the positive fifth lens element L5, the negative sixth lens element L6, the positive seventh lens element L7, and the positive cemented lens elements constituted by negative eighth lens element L8 and the positive ninth lens element L9, in this order from the first lens group 10.

In the arrangement of the lens elements, it is preferable that the positive seventh lens element L7 satisfies conditions (4) and (5).

If n7 exceeds the upper limit of condition (4), the back focal distance of the lens system becomes shorter.

If n7 exceeds the lower limit of condition (4), the overall length of the lens system becomes too long, so that cost-effectiveness of the lens system is decreased.

If ν7 exceeds the upper limit of condition (5), color correction becomes under.

If ν7 exceeds the lower limit of condition (5), color correction becomes over.

In the above arrangement of the lens elements, by allowing one and the other of the eighth lens element L8 and the ninth lens element L9 to satisfy conditions (6) to (9), color correction up to the near-infrared light wavelength range becomes possible, while aberrations can be corrected suitably.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. S designates the sagittal image, and M designates the meridional image. In the tables, Fno designates the F-number, f designates the focal length of the entire lens system, fB designates the back focal distance, i.e., from the most image-side surface of the cover glass C to the image-forming surface of the image pick-up device. W designates the half angle-of-view (°), r designates the radius of curvature, d designates the lens-element thickness or distance between lens elements, Nd designates the refractive index of the d-line (wavelength: 588 nm), and ν designates the Abbe number.

[Embodiment 1]

Figure 1:
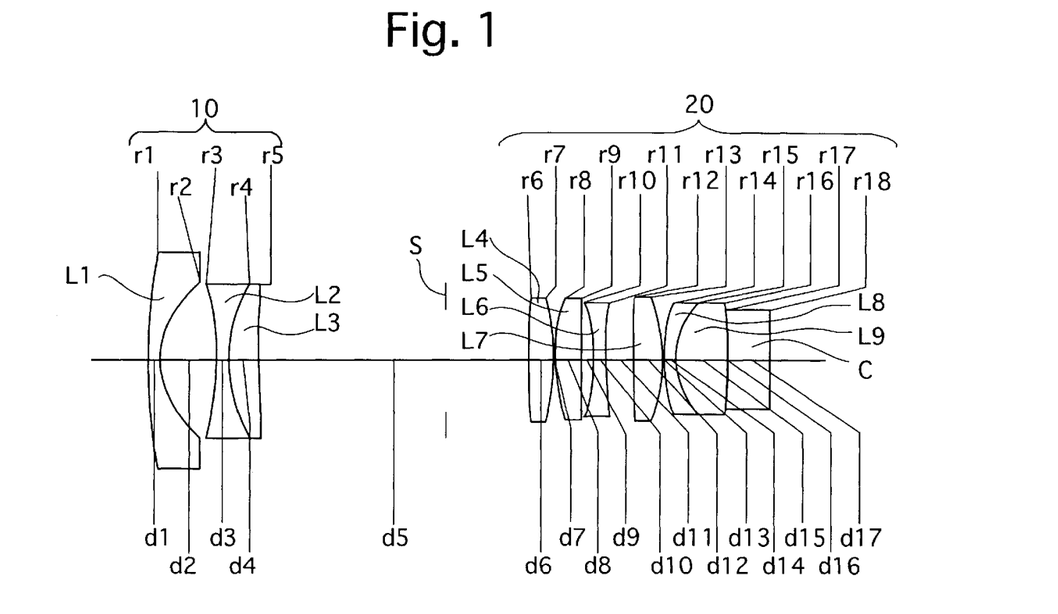
FIG. 1 shows a lens arrangement of a variable-focus lens system at the short focal length extremity, according to a first embodiment of the present invention.
Figure 2A:
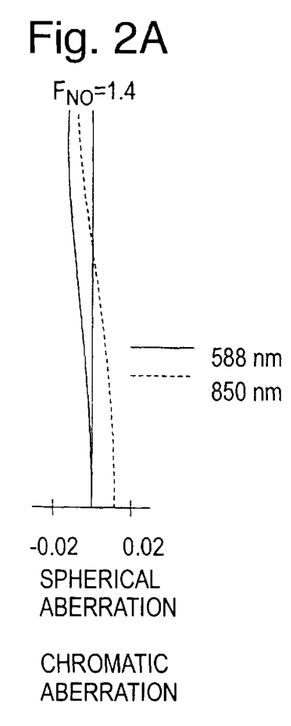
FIGS. 2A, 2B and 2C show aberrations occurred in the lens arrangement shown in FIG. 1.
Figure 2B:
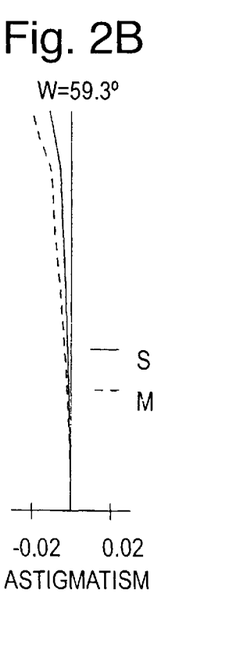
Figure 2C:
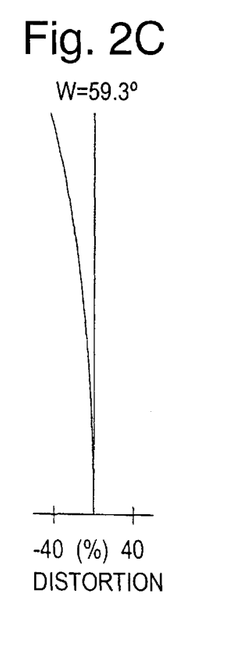
Figure 3:
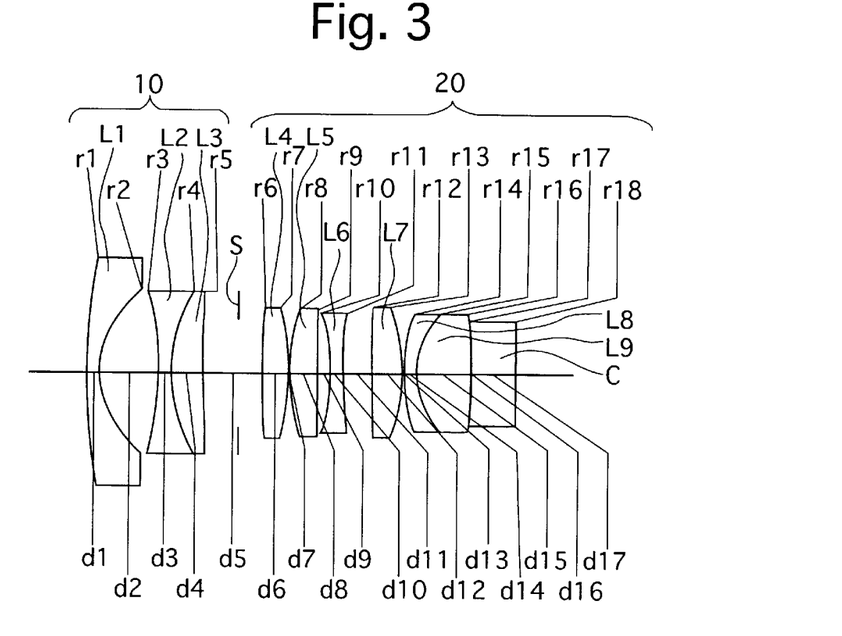
FIG. 3 shows the lens arrangement of the variable-focus lens system at the long focal length extremity, according to the first embodiment of the present invention.
Figures 4A, 4B:
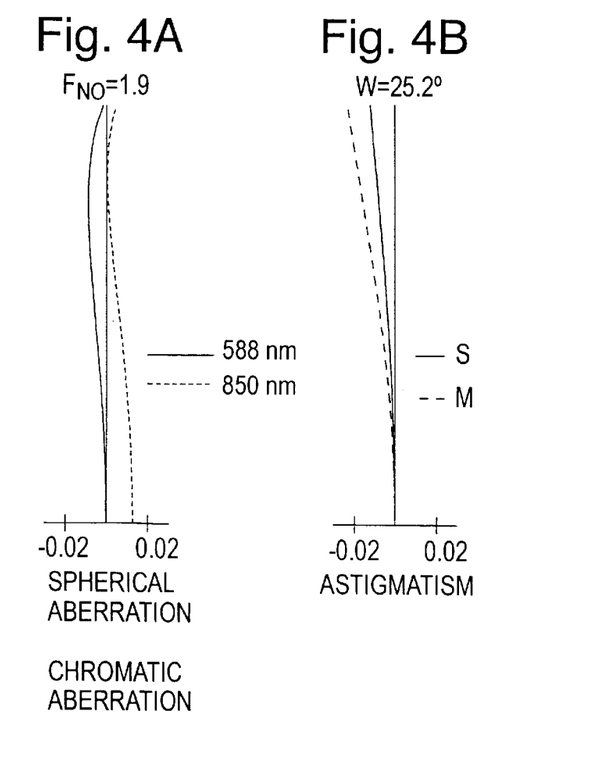
FIGS. 4A, 4B and 4C show aberrations occurred in the lens arrangement shown in FIG. 3.
Figure 4C:
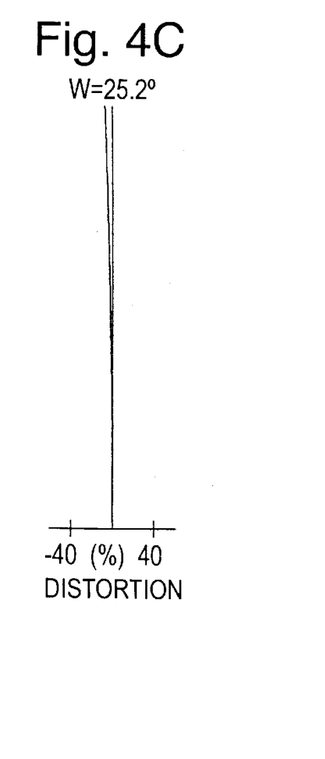

FIGS. 1 through 4 show the first embodiment of the variable-focus lens system. FIGS. 1 and 3 show the lens arrangements at the short focal length extremity and the long focal length extremity, respectively. FIGS. 2A through 2C, and FIGS. 4A through 4C show aberrations occurred in the lens arrangements respectively shown in FIGS. 1 and 3. Table 1 shows the numerical data of the first embodiment.

TABLE 1

FNO = 1:1.4–1.9
f = 1.0–2.16
W = 59.3–25.2
fB = 2.16–3.49

| Surface No. | r | d | Nd | ν |
|---|---|---|---|---|
| 1 | 12.365 | 0.278 | 1.83400 | 37.2 |
| 2 | 2.111 | 1.261 | — | — |
| 3 | −5.707 | 0.250 | 1.48749 | 70.2 |
| 4 | 3.282 | 0.667 | 1.84666 | 23.8 |
| 5 | 17.290 | 4.208–0.771 | — | — |
| diaphragm | ∞ | 1.865–0.539 | — | — |
| 6 | 26.849 | 0.536 | 1.71300 | 53.9 |
| 7 | −4.952 | 0.028 | — | — |
| 8 | 3.764 | 0.556 | 1.80610 | 40.9 |
| 9 | 47.226 | 0.303 | — | — |
| 10 | −3.556 | 0.250 | 1.80518 | 25.4 |
| 11 | 7.442 | 0.639 | — | — |
| 12 | 37.610 | 0.639 | 1.80100 | 35.0 |
| 13 | −3.475 | 0.028 | — | — |
| 14 | 3.516 | 0.250 | 1.84666 | 23.8 |
| 15 | 1.755 | 1.122 | 1.49700 | 81.6 |
| 16 | −20.537 | 0.000 | — | — |
| 17 | ∞ | 0.972 | 1.49782 | 66.8 |
| 18 | ∞ | — | — | — |

[Embodiment 2]

Figure 5:
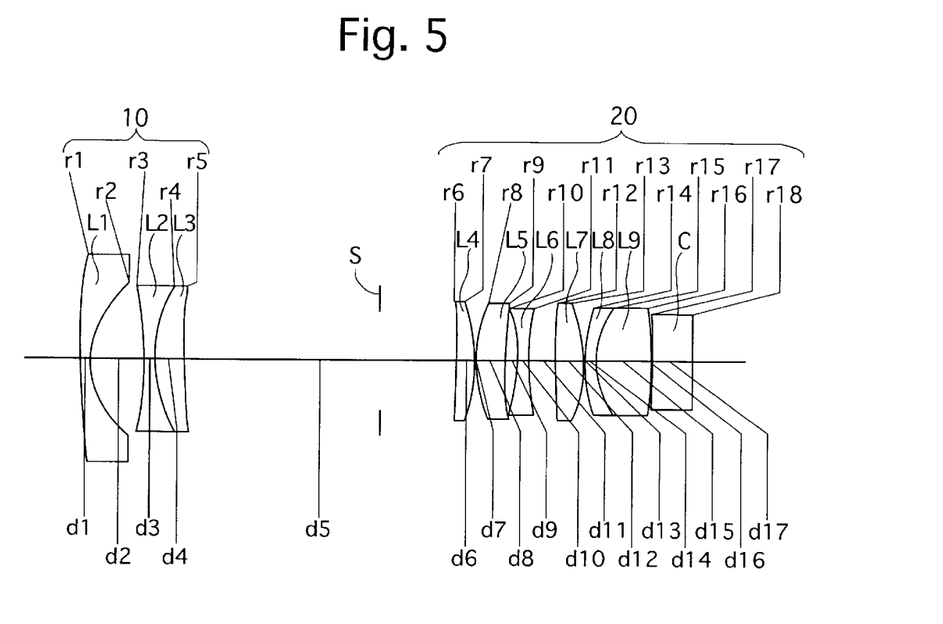
FIG. 5 shows a lens arrangement of a variable-focus lens system at the short focal length extremity, according to a second embodiment of the present invention.
Figure 6A:
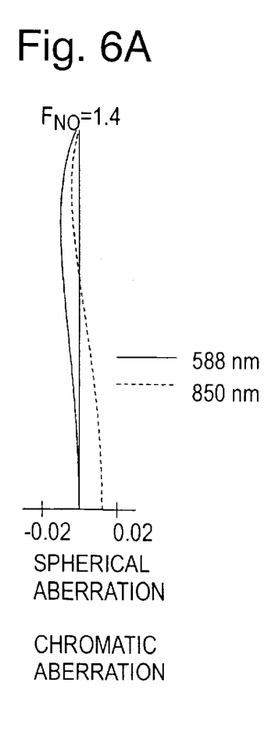
FIGS. 6A, 6B and 6C show aberrations occurred in the lens arrangement shown in FIG. 5.
Figure 6B:
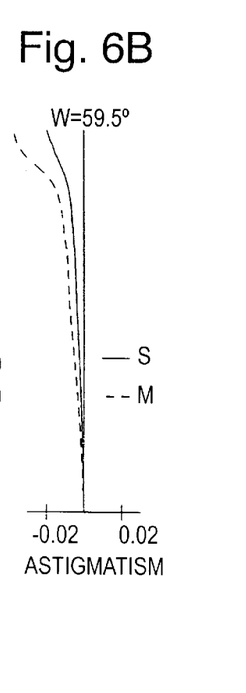
Figure 6C:
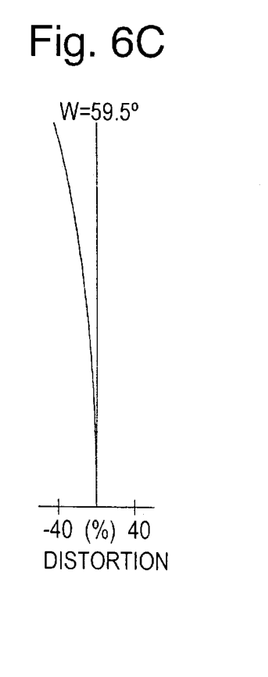
Figure 7:
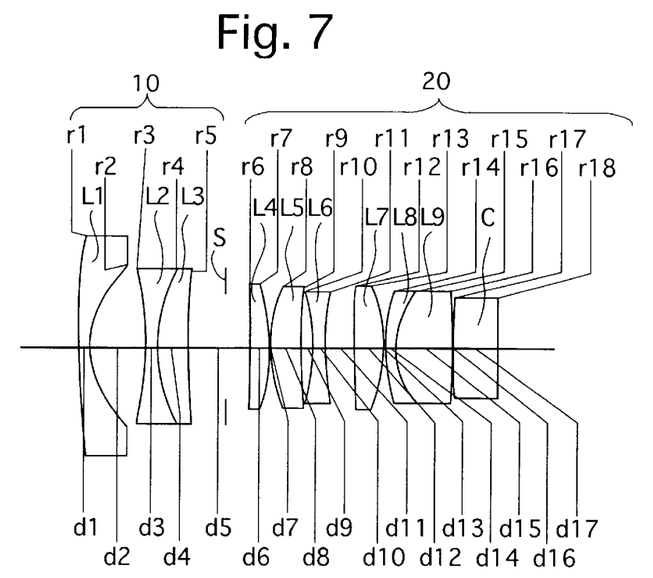
FIG. 7 shows the lens arrangement of the variable-focus lens system at the long focal length extremity, according to the second embodiment of the present invention.
Figure 8A:
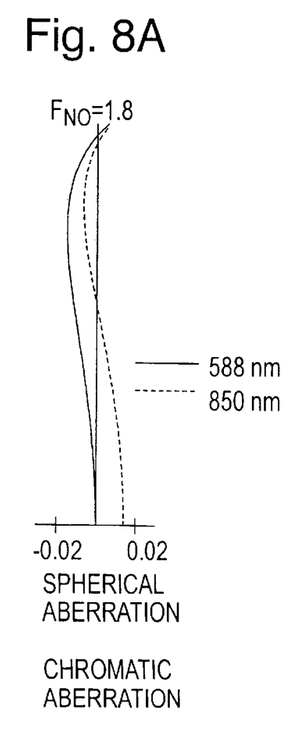
FIGS. 8A, 8B and 8C show aberrations occurred in the lens arrangement shown in FIG. 7.
Figure 8B:
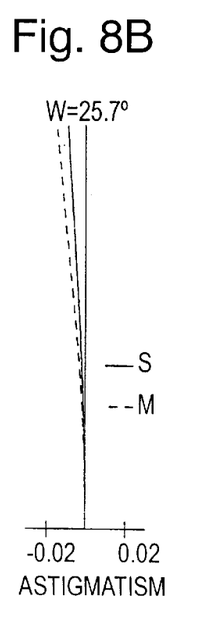
Figure 8C:
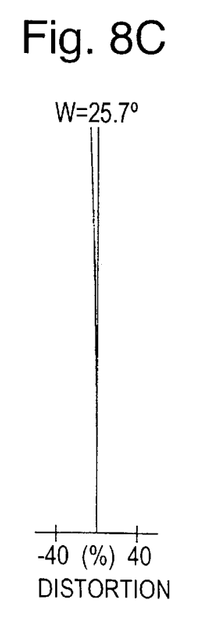

FIGS. 5 through 8 show the second embodiment of the variable-focus lens system. FIGS. 5 and 7 show the lens arrangements at the short focal length extremity and the long focal length extremity, respectively. FIGS. 6A through 6C, and FIGS. 8A through 8C show aberrations occurred in the lens arrangements respectively shown in FIGS. 5 and 7. Table 2 shows the numerical data of the second embodiment. The basic arrangement of the second embodiment is the same as the first embodiment.

TABLE 2

FNO = 1:1.4–1.8
f = 1.0–2.11
W = 59.5–25.7
fB = 2.09–3.32

| Surface No. | r | d | Nd | ν |
|---|---|---|---|---|
| 1 | 13.646 | 0.278 | 1.83400 | 37.2 |
| 2 | 2.204 | 1.261 | — | — |
| 3 | −6.982 | 0.250 | 1.48749 | 70.2 |
| 4 | 3.271 | 0.667 | 1.84666 | 23.8 |
| 5 | 14.261 | 4.606–0.856 | — | — |
| diaphragm | ∞ | 1.792–0.556 | — | — |
| 6 | −24.047 | 0.417 | 1.71300 | 53.9 |
| 7 | −3.749 | 0.028 | — | — |
| 8 | 3.108 | 0.683 | 1.80610 | 40.9 |
| 9 | 13.101 | 0.283 | — | — |
| 10 | −3.279 | 0.250 | 1.80518 | 25.4 |
| 11 | 6.066 | 0.656 | — | — |
| 12 | 31.476 | 0.642 | 1.80100 | 35.0 |
| 13 | −3.250 | 0.028 | — | — |
| 14 | 3.693 | 0.250 | 1.84666 | 23.8 |
| 15 | 1.840 | 1.258 | 1.49700 | 81.6 |
| 16 | −11.324 | 0.000 | — | — |
| 17 | ∞ | 0.972 | 1.49782 | 66.8 |
| 18 | ∞ | — | — | — |

[Embodiment 3]

Figure 9:
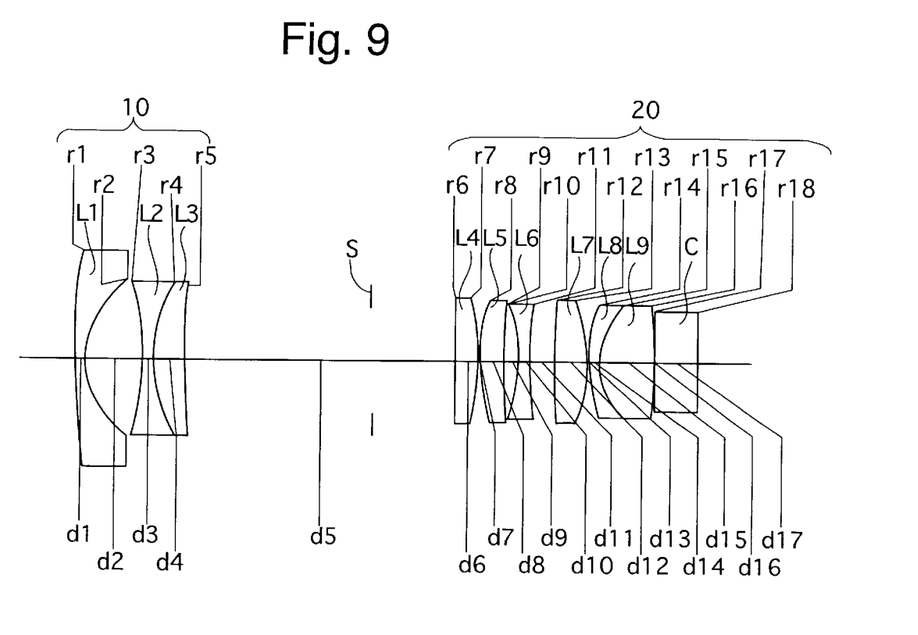
FIG. 9 shows a lens arrangement of a variable-focus lens system at the short focal length extremity, according to a third embodiment of the present invention.
Figure 10A:
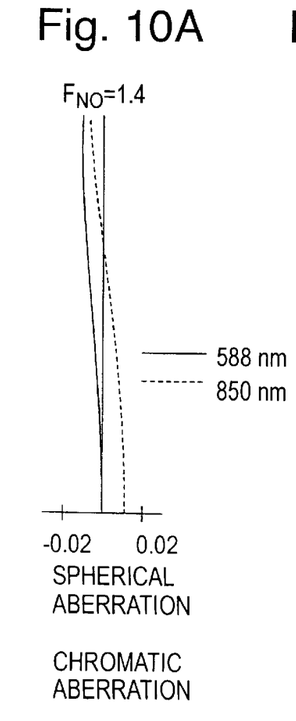
FIGS. 10A, 10B and 10C show aberrations occurred in the lens arrangement shown in FIG. 9.
Figure 10B:
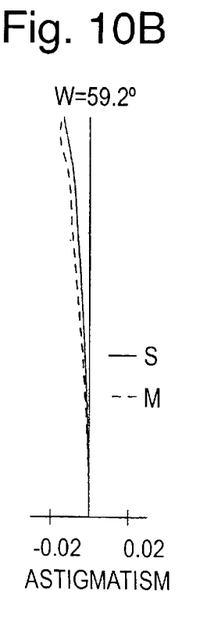
Figure 10C:
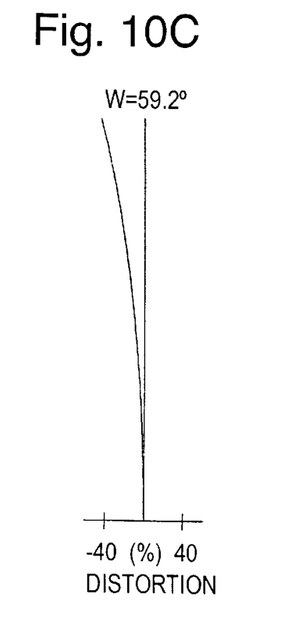
Figure 11:
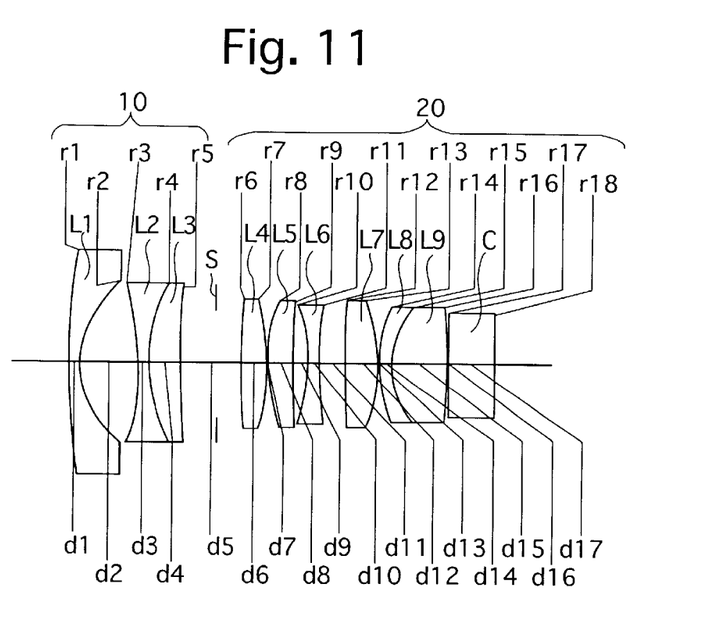
FIG. 11 shows the lens arrangement of the variable-focus lens system at the long focal length extremity, according to the third embodiment of the present invention.
Figure 12A:
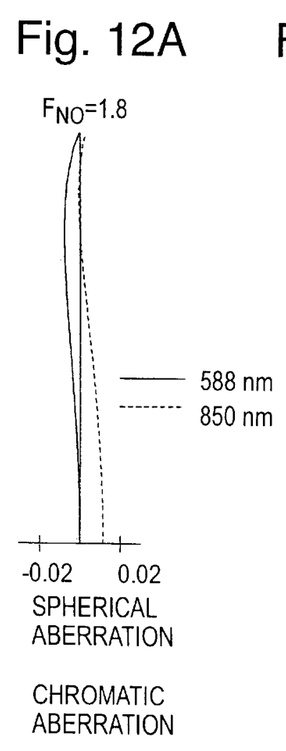
FIGS. 12A, 12B and 12C show aberrations occurred in the lens arrangement shown in FIG. 11.
Figure 12B:
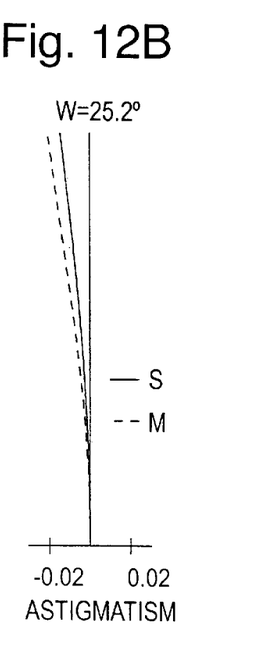
Figure 12C:
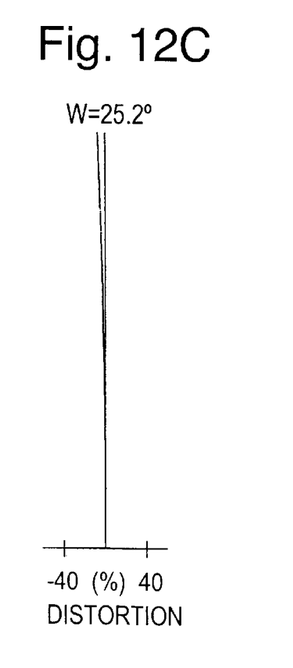

FIGS. 9 through 12 show the third embodiment of the variable-focus lens system. FIGS. 9 and 11 show the lens arrangements at the short focal length extremity and the long focal length extremity, respectively. FIGS. 10A through 10C, and FIGS. 12A through 12C show aberrations occurred in the lens arrangements respectively shown in FIGS. 9 and 11. Table 3 shows the numerical data of the third embodiment. The basic arrangement of the third embodiment is the same as the first embodiment.

TABLE 3

FNO = 1:1.4–1.8
f = 1.0–2.16
W = 59.2–25.2
fB = 2.08–3.41

| Surface No. | r | d | Nd | ν |
|---|---|---|---|---|
| 1 | 12.365 | 0.278 | 1.83400 | 37.2 |
| 2 | 2.111 | 1.261 | — | — |
| 3 | −5.707 | 0.250 | 1.48749 | 70.2 |
| 4 | 3.282 | 0.667 | 1.84666 | 23.8 |
| 5 | 17.290 | 4.208–0.771 | — | — |
| diaphragm | ∞ | 1.865–0.539 | — | — |
| 6 | 26.849 | 0.536 | 1.71300 | 53.9 |
| 7 | −4.952 | 0.028 | — | — |
| 8 | 3.764 | 0.556 | 1.80610 | 40.9 |
| 9 | 47.226 | 0.303 | — | — |
| 10 | −3.556 | 0.250 | 1.80518 | 25.4 |
| 11 | 7.442 | 0.578 | — | — |
| 12 | 24.139 | 0.695 | 1.74950 | 35.3 |
| 13 | −3.409 | 0.028 | — | — |
| 14 | 3.272 | 0.250 | 1.84666 | 23.8 |
| 15 | 1.739 | 1.206 | 1.45600 | 90.3 |
| 16 | −12.667 | 0.000 | — | — |
| 17 | ∞ | 0.972 | 1.49782 | 66.8 |
| 18 | ∞ | — | — | — |

[Embodiment 4]

Figure 13:
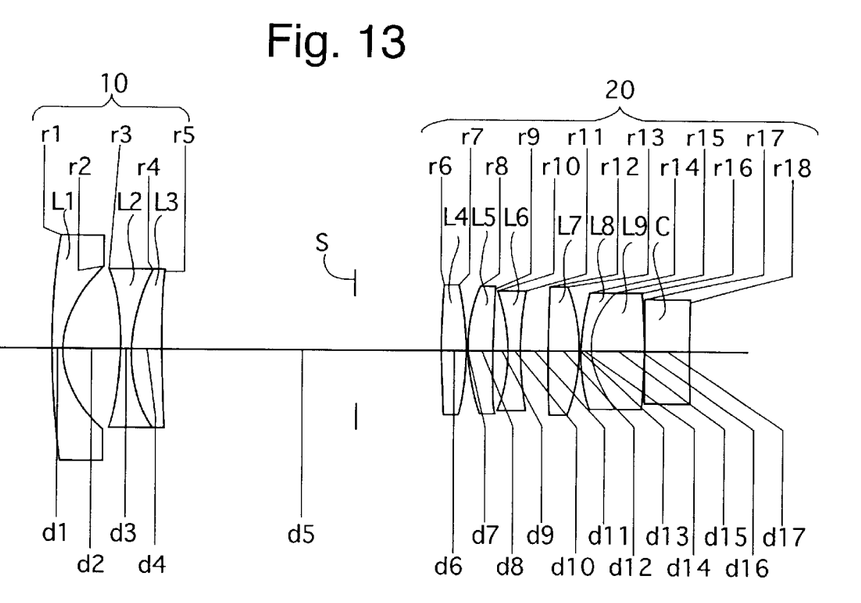
FIG. 13 shows a lens arrangement of a variable-focus lens system at the short focal length extremity, according to a fourth embodiment of the present invention.
Figure 14A:
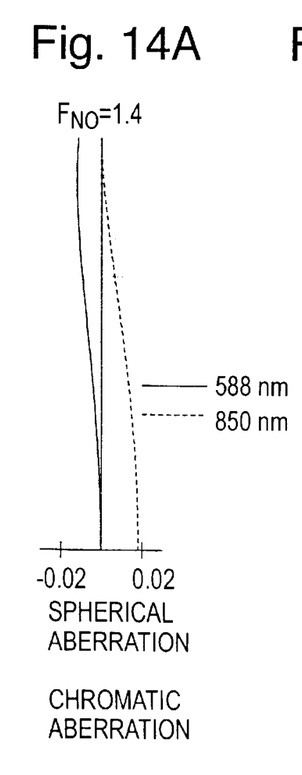
FIGS. 14A, 14B and 14C show aberrations occurred in the lens arrangement shown in FIG. 13.
Figure 14B:
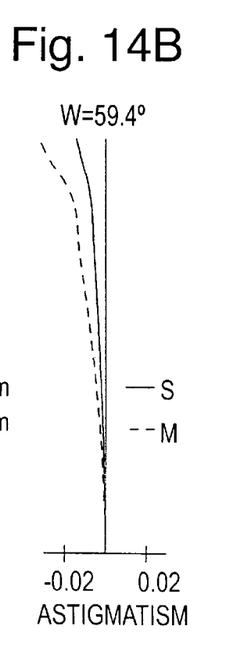
Figure 14C:
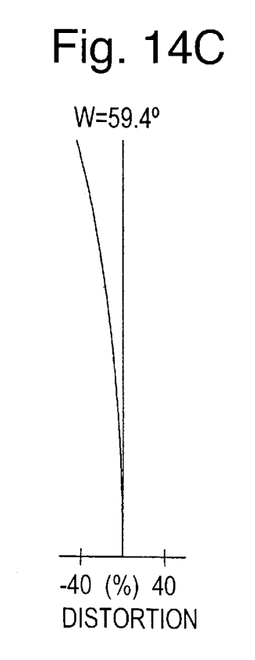
Figure 15:
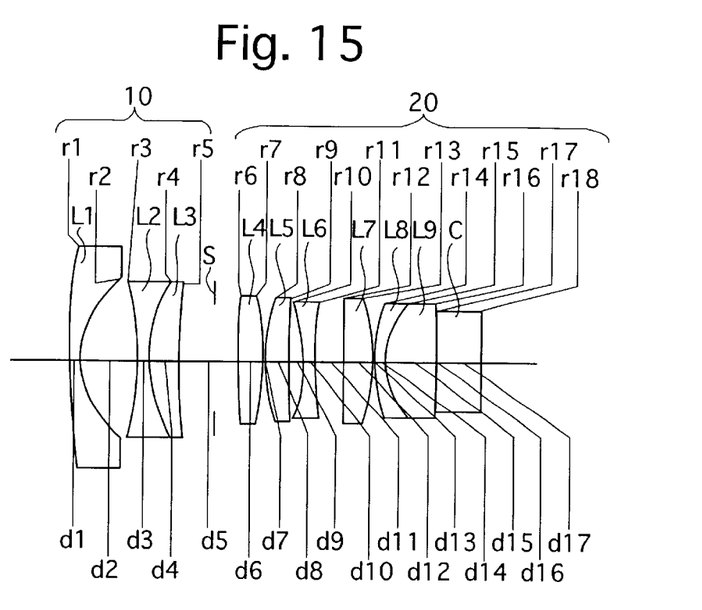
FIG. 15 shows the lens arrangement of the variable-focus lens system at the long focal length extremity, according to the fourth embodiment of the present invention.
Figure 16A:
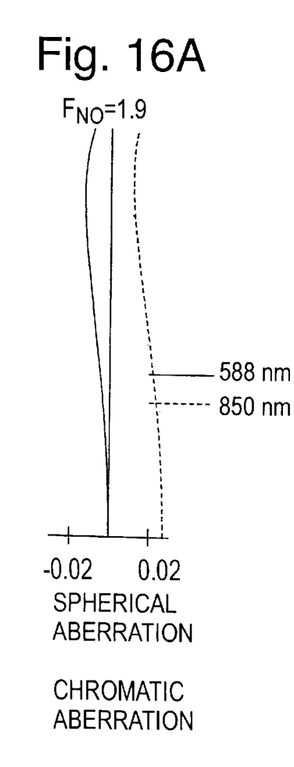
FIGS. 16A, 16B and 16C show aberrations occurred in the lens arrangement shown in FIG. 15.
Figure 16B:
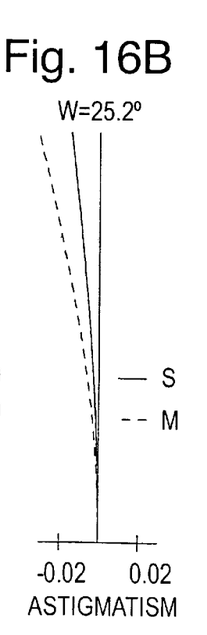
Figure 16C:
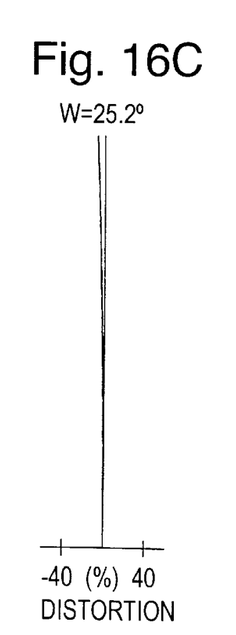

FIGS. 13 through 16 show the fourth embodiment of the variable-focus lens system. FIGS. 13 and 15 show the lens arrangements at the short focal length extremity and the long focal length extremity, respectively. FIGS. 14A through 14C, and FIGS. 16A through 16C show aberrations occurred in the lens arrangements respectively shown in FIGS. 13 and 15. Table 4 shows the numerical data of the fourth embodiment. The basic arrangement of the fourth embodiment is the same as the first embodiment.

TABLE 4

FNO = 1:1.4–1.9
f = 1.0–2.16
W = 59.4–25.2
fB = 2.16–3.49

| Surface No. | r | d | Nd | ν |
|---|---|---|---|---|
| 1 | 12.365 | 0.278 | 1.83400 | 37.2 |
| 2 | 2.111 | 1.261 | — | — |
| 3 | −5.707 | 0.250 | 1.48749 | 70.2 |
| 4 | 3.282 | 0.667 | 1.84666 | 23.8 |
| 5 | 17.290 | 4.208–0.771 | — | — |
| diaphragm | ∞ | 1.865–0.539 | — | — |
| 6 | 26.849 | 0.536 | 1.71300 | 53.9 |
| 7 | −4.952 | 0.028 | — | — |
| 8 | 3.764 | 0.556 | 1.80610 | 40.9 |
| 9 | 47.226 | 0.303 | — | — |
| 10 | −3.556 | 0.250 | 1.80518 | 25.4 |
| 11 | 7.442 | 0.631 | — | — |
| 12 | 43.892 | 0.656 | 1.80100 | 35.0 |
| 13 | −3.458 | 0.028 | — | — |
| 14 | 3.458 | 0.250 | 1.84666 | 23.8 |
| 15 | 1.784 | 1.111 | 1.48749 | 70.2 |
| 16 | −20.779 | 0.000 | — | — |
| 17 | ∞ | 0.972 | 1.49782 | 66.8 |
| 18 | ∞ | — | — | — |

[Embodiment 5]

Figure 17:
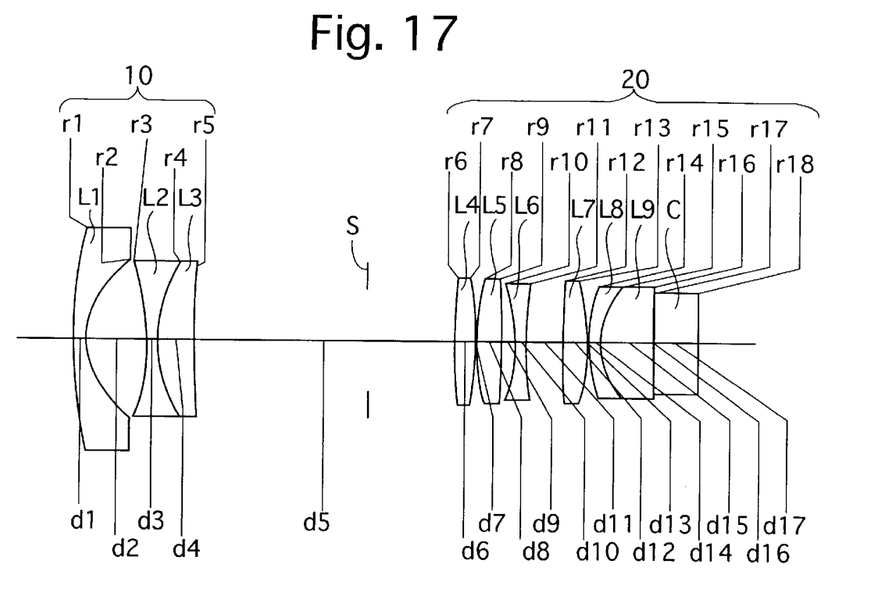
FIG. 17 shows a lens arrangement of a variable-focus lens system at the short focal length extremity, according to a fifth embodiment of the present invention.
Figure 18A:
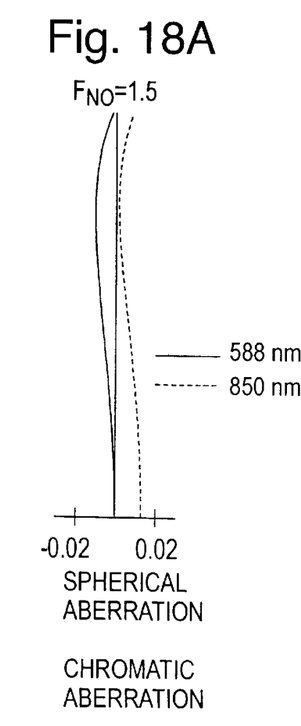
FIGS. 18A, 18B and 18C show aberrations occurred in the lens arrangement shown in FIG. 17.
Figure 18B:
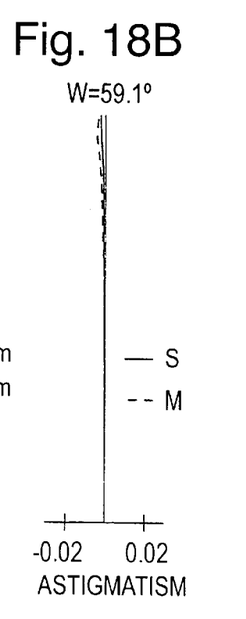
Figure 18C:
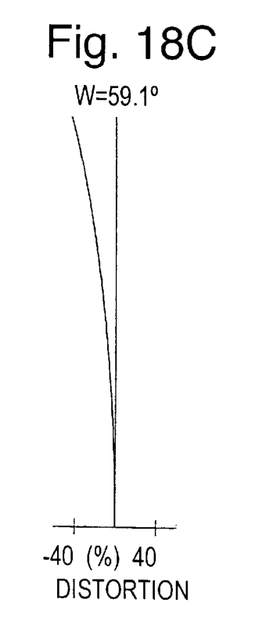
Figure 19:
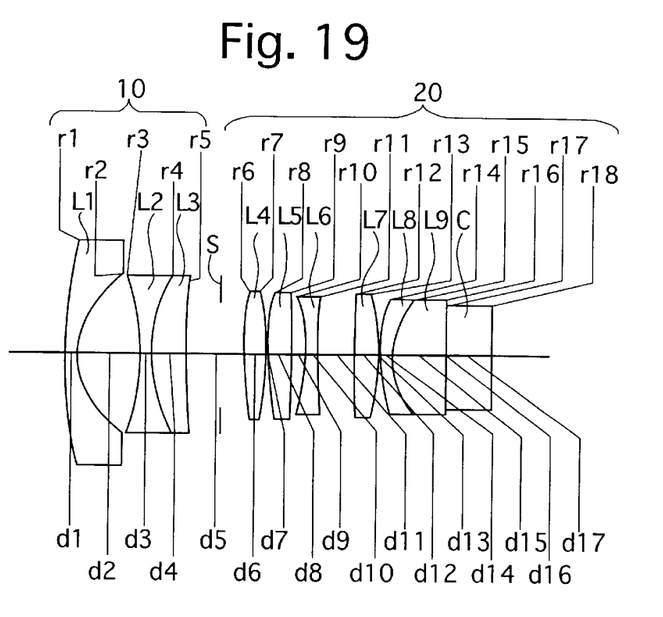
FIG. 19 shows the lens arrangement of the variable-focus lens system at the long focal length extremity, according to the fifth embodiment of the present invention.
Figure 20A:
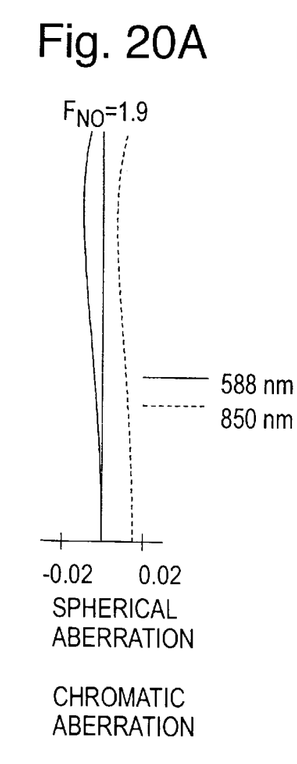
FIGS. 20A, 20B and 20C show aberrations occurred in the lens arrangement shown in FIG. 19.
Figure 20B:
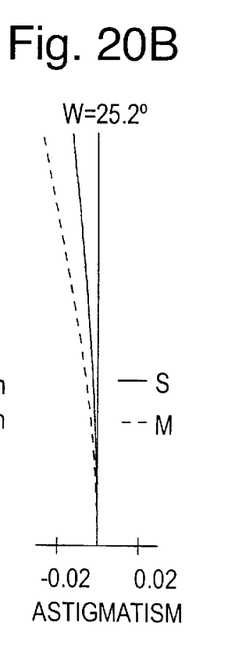
Figure 20C:
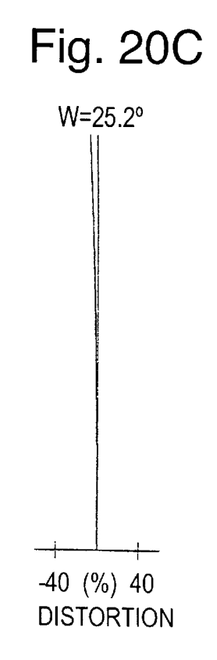

FIGS. 17 through 20 show the fifth embodiment of the variable-focus lens system. FIGS. 17 and 19 show the lens arrangements at the short focal length extremity and the long focal length extremity, respectively. FIGS. 18A through 18C, and FIGS. 20A through 20C show aberrations occurred in the lens arrangements respectively shown in FIGS. 17 and 19. Table 5 shows the numerical data of the fifth embodiment. The basic arrangement of the fifth embodiment is the same as the first embodiment.

TABLE 5

ENO = 1:1.5–1.9
f = 1.0–2.16
W = 59.1–25.2
fB = 2.10–3.50

| Surface No. | r | d | Nd | ν |
|---|---|---|---|---|
| 1 | 9.921 | 0.278 | 1.83400 | 37.2 |
| 2 | 1.980 | 1.333 | — | — |
| 3 | −4.847 | 0.250 | 1.48749 | 70.2 |
| 4 | 3.208 | 0.767 | 1.84666 | 23.8 |
| 5 | 18.836 | 3.852–0.763 | — | — |
| diaphragm | ∞ | 1.916–0.514 | — | — |
| 6 | 9.439 | 0.461 | 1.71300 | 53.9 |
| 7 | −6.869 | 0.028 | — | — |
| 8 | 5.390 | 0.542 | 1.80610 | 40.9 |
| 9 | −20.029 | 0.292 | — | — |
| 10 | −3.736 | 0.250 | 1.80518 | 25.4 |
| 11 | 11.094 | 0.789 | — | — |
| 12 | 21.438 | 0.547 | 1.80100 | 35.0 |
| 13 | −4.219 | 0.028 | — | — |
| 14 | 3.303 | 0.250 | 1.84666 | 23.8 |
| 15 | 1.678 | 1.170 | 1.49700 | 81.6 |
| 16 | −79.926 | 0.000 | — | — |
| 17 | ∞ | 0.972 | 1.49782 | 66.8 |
| 18 | ∞ | — | — | — |

The numerical values of each condition of each embodiment are shown in Table 6.

TABLE 6

| | Embod. 1 | Embod. 2 | Embod. 3 | Embod. 4 | Embod. 5 |
|---|---|---|---|---|---|
| Cond. (1) | −2.786 | −2.920 | −2.786 | −2.786 | −2.631 |
| Cond. (2) | 3.182 | 3.241 | 3.182 | 3.182 | 3.177 |
| Cond. (3) | −0.359 | −0.343 | −0.359 | −0.359 | −0.380 |
| | −0.776 | −0.724 | −0.776 | −0.776 | −0.822 |
| Cond. (4) | 1.80100 | 1.80100 | 1.74950 | 1.80100 | 1.80100 |
| Cond. (5) | 35.0 | 35.0 | 35.3 | 35.0 | 35.0 |
| Cond. (6) | 81.6 | 81.6 | 90.3 | 70.2 | 81.6 |
| Cond. (7) | 20.820 | 22.145 | 23.856 | 19.924 | 18.125 |
| Cond. (8) | 23.8 | 23.8 | 23.8 | 23.8 | 23.8 |
| Cond. (9) | −5.832 | −7.188 | −5.494 | −5.735 | −4.971 |

The upper and lower rows shown in Table 6 for condition (3) designate the numerical values at the short focal length extremity and long focal length extremity, respectively.

As can be understood from Table 6, the numerical values of the first through fifth embodiments satisfy conditions (1) through (9). Furthermore, as shown in the aberration diagrams, aberrations are adequately corrected at each focal length. In particular, chromatic aberration which is depicted along with spherical aberration can be corrected to a practically trouble-free level from a visible light range of 588 nm to an infrared light range of 850 nm.

According to the above description, a variable-focus lens system which can suitably correct aberrations in a visible light wavelength range and a near-infrared light wavelength range can be obtained.

What is claimed is:

1. A variable-focus lens system consisting of a negative front lens group, and a positive rear lens group, in this order from an object;

wherein the focal length of said variable-focus lens system is varied by changing the distance between said front lens group and said rear lens group; and wherein said lens system satisfies the following conditions:

$$-3.0 < fx/Fw < -2.5$$

$$3.0 < fy/Fw < 3.5$$

wherein
fx designates the focal length of said front lens group (fx<0);
fy designates the focal length of said rear lens group (fy>0); and
Fw designates the focal length of the entire variable-focus lens system at the short focal length extremity.

2. The variable-focus lens system according to claim 1, wherein said rear lens group satisfies the following condition:

$$-0.9 < m < -0.3$$

wherein
m designates the image-forming magnification of said rear lens group.

3. The variable-focus lens system according to claim 1, wherein said front lens group comprises two sub-lens groups comprising three lens elements.

4. The variable-focus lens system according to claim 1, wherein said rear lens group comprises five sub-lens groups comprising six lens elements.

5. The variable-focus lens system according to claim 3, wherein said rear lens group comprises a positive L4 lens element, a positive L5 lens element, a negative L6 lens element, a positive L7 lens element, and positive cemented lens elements comprising a negative L8 lens element and a positive L9 lens element, in this order from said front lens group.

6. The variable-focus lens system according to claim 5, wherein said positive L7 lens element satisfies the following conditions:

$$1.73 < n7 < 1.83$$

$$30 < v7 < 40$$

wherein
n7 designates the refractive index of said L7 lens element; and
v7 designates the Abbe number of said L7 lens element.

7. The variable-focus lens system according to claim 5, wherein one of said L8 lens element and said L9 lens element of said cemented lens elements comprises a convex lens element that satisfies the following conditions:

$$70 < v\text{-convex}$$

$$14.0 < f\text{-convex}/Fw < 25.0$$

wherein
v-convex designates the Abbe number of said convex lens element;
f-convex designates the focal length of said convex lens element; and wherein the other of said L8 lens element and said L9 lens element comprises a concave lens element that satisfies the following conditions:

$$30 > v\text{-concave}$$

$$-7.3 < f\text{-concave}/Fw < -4.5$$

wherein
v-concave designates the Abbe number of said concave lens element; and
f-concave designates the focal length of said concave lens element.

8. A variable-focus lens system comprising a negative front lens group, and a positive rear lens group, in this order from an object;

wherein the focal length of said variable-focus lens system is varied by changing the distance between said front lens group and said rear lens group;

wherein said lens system satisfies the following conditions:

$$-3.0 < fx/Fw < -2.5$$

$$3.0 < fy/Fw < 3.5$$

wherein
fx designates the focal length of said front lens group (fx<0);
fy designates the focal length of said rear lens group (fy>0); and
Fw designates the focal length of the entire variable-focus lens system at the short focal length extremity; and wherein said rear lens group satisfies the following condition:

$$-0.9 < m < -0.3$$

wherein
m designates the image-forming magnification of said rear lens group.

9. The variable-focus lens system according to claim 8, wherein said front lens group comprises two sub-lens groups comprising three lens elements.

10. The variable-focus lens system according to claim 8, wherein said rear lens group comprises five sub-lens groups comprising six lens elements.

11. The variable-focus lens system according to claim 9, wherein said rear lens group comprises a positive L4 lens element, a positive L5 lens element, a negative L6 lens element, a positive L7 lens element, and positive cemented lens elements comprising a negative L8 lens element and a positive L9 lens element, in this order from said front lens group.

12. The variable-focus lens system according to claim 11, wherein said positive L7 lens element satisfies the following conditions:

$$1.73 < n7 < 1.83$$

$$30 < v7 < 40$$

wherein n7 designates the refractive index of said L7 lens element; and v7 designates the Abbe number of said L7 lens element.

13. The variable-focus lens system according to claim 11, wherein one of said L8 lens element and said L9 lens element of said cemented lens elements comprises a convex lens element that satisfies the following conditions:

$$70 < v\text{-convex}$$

$$14.0 < f\text{-convex}/Fw < 25.0$$

wherein v-convex designates the Abbe number of said convex lens element;

f-convex designates the focal length of said convex lens element; and wherein the other of said L8 lens element and said L9 lens element comprises a concave lens element that satisfies the following conditions:

$$30 > v\text{-concave}$$

$$-7.3 < f\text{-concave}/Fw < -4.5$$

wherein v-concave designates the Abbe number of said concave lens element; and f-concave designates the focal length of said concave lens element.

14. A variable-focus lens system comprising a negative front lens group, and a positive rear lens group, in this order from an object;

wherein the focal length of said variable-focus lens system is varied by changing the distance between said front lens group and said rear lens group;

wherein said rear lens group comprises five sub-lens groups comprising six lens elements; and wherein said lens system satisfies the following conditions:

$$-3.0 < fx/Fw < -2.5$$

$$3.0 fy/Fw < 3.5$$

wherein fx designates the focal length of said front lens group (fx<0);

fy designates the focal length of said rear lens group (fy>0); and

Fw designates the focal length of the entire variable-focus lens system at the short focal length extremity.

15. The variable-focus lens system according to claim 14, wherein said front lens group comprises two sub-lens groups comprising three lens elements.

16. The variable-focus lens system according to claim 16, wherein said rear lens group comprises a positive L4 lens element, a positive L5 lens element, a negative L6 lens element, a positive L7 lens element, and positive cemented lens elements comprising a negative L8 lens element and a positive L9 lens element, in this order from said front lens group.

17. The variable-focus lens system according to claim 17, wherein said positive L7 lens element satisfies the following conditions:

$$1.73 < n7 < 1.83$$

$$30 < v7 < 40$$

wherein n7 designates the refractive index of said L7 lens element; and v7 designates the Abbe number of said L7 lens element.

18. The variable-focus lens system according to claim 17, wherein one of said L8 lens element and said L9 lens element of said cemented lens elements comprises a convex lens element that satisfies the following conditions:

$$70 < v\text{-convex}$$

$$14.0 < f\text{-convex}/Fw < 25.0$$

wherein v-convex designates the Abbe number of said convex lens element;

f-convex designates the focal length of said convex lens element; and wherein the other of said L8 lens element and said L9 lens element comprises a concave lens element that satisfies the following conditions:

$$30 > v\text{-concave}$$

$$-7.3 < f\text{-concave}/Fw < -4.5$$

wherein v-concave designates the Abbe number of said concave lens element; and f-concave designates the focal length of said concave lens element.

* * * * *